United States Patent [19]

Frische et al.

[11] 3,985,848

[45] Oct. 12, 1976

[54] METHOD FOR CUTTING CONCRETE COATED PIPE

[75] Inventors: Onno F. Frische, Tynaarlo; Hans De Kok, Hoogezand, both of Netherlands

[73] Assignee: Bredero Price, B.V., The Hague, Netherlands

[22] Filed: Dec. 5, 1974

[21] Appl. No.: 529,803

[52] U.S. Cl. .................................. 264/88; 83/57; 83/177; 264/79; 264/135; 264/139
[51] Int. Cl.² .................... B28B 1/48; B28B 11/14
[58] Field of Search ............ 264/88, 138, 139, 154, 264/228, 284, 293, 79, 135; 83/53, 177

[56] References Cited
UNITED STATES PATENTS

| | | | |
|---|---|---|---|
| 2,302,020 | 11/1942 | Frederick | 264/88 X |
| 2,881,503 | 4/1959 | Johnson | 83/53 X |
| 3,165,564 | 1/1965 | Howle | 264/293 X |
| 3,212,378 | 10/1965 | Rice | 83/177 X |
| 3,761,557 | 9/1973 | Werner | 264/228 |

Primary Examiner—Robert F. White
Assistant Examiner—Thomas P. Pavelko
Attorney, Agent, or Firm—Lowe, Kokjer, Kircher, Wharton & Bowman

[57] ABSTRACT

A method for cutting an arcuate groove in an uncured concrete coating on an arcuate surface. A jet stream of water is directed at the coating along a line extending tangentially of the surface in a downward direction. The object is rotated at a relatively low speed in relation to the stationary water jet. The invention also encompasses a method of applying a concrete coating to pipe wherein after the cement is forced onto the pipe a wrapping material is wound around the pipe in a spiral pattern to hold on the concrete. The wrapping material may be a water impervious plastic which will affect curing of the cement without the aid of chemical curing agents.

2 Claims, 18 Drawing Figures

U.S. Patent  Oct 12, 1976  Sheet 1 of 2  3,985,848
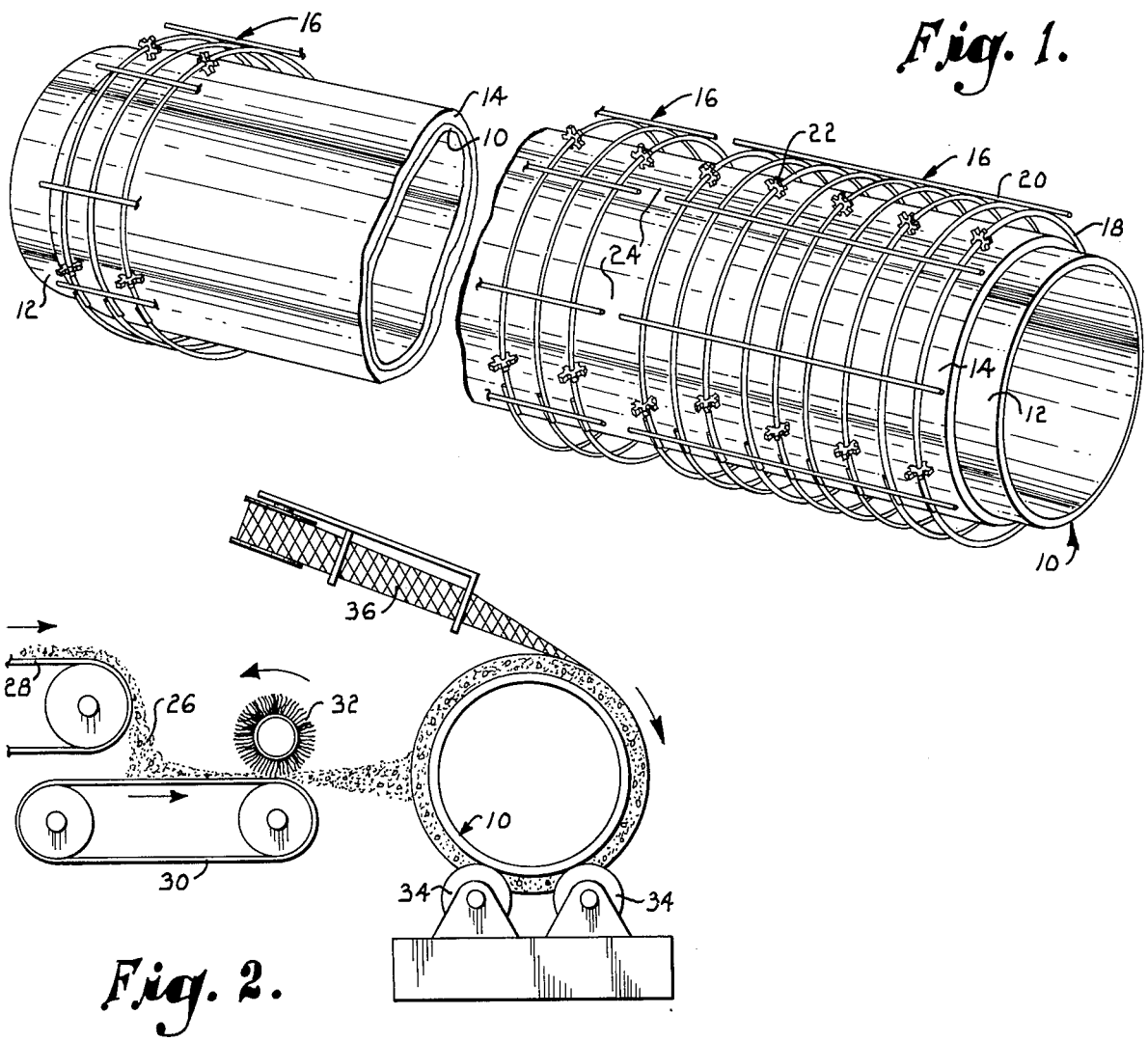
Fig. 1.
Fig. 2.
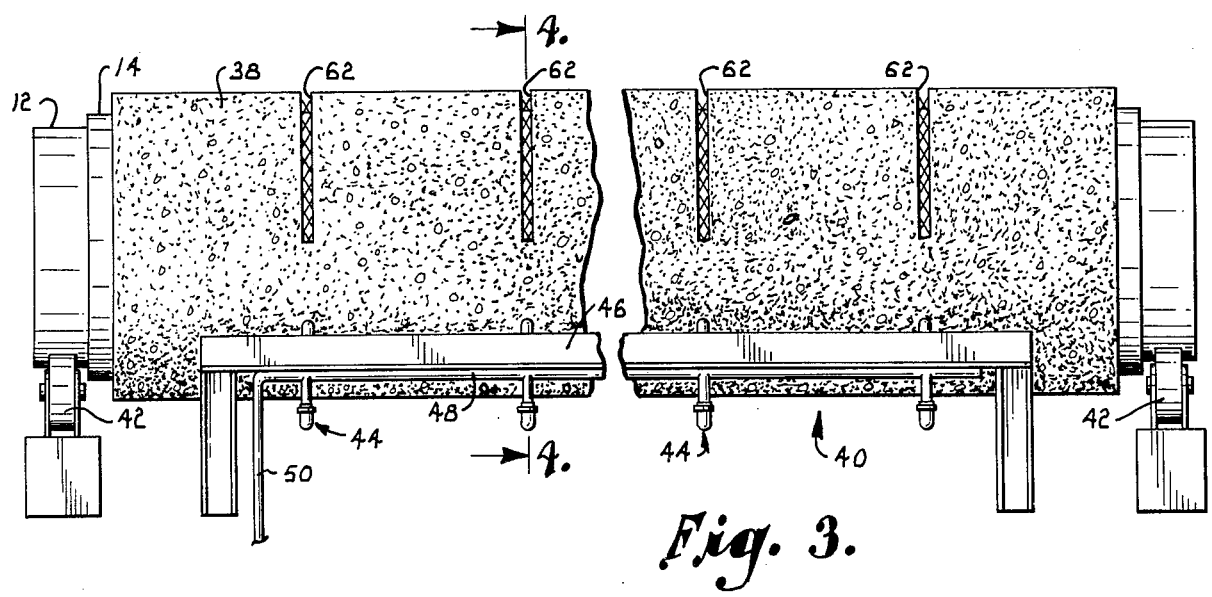
Fig. 3.

METHOD FOR CUTTING CONCRETE COATED PIPE

This invention relates to the cutting of grooves in concrete and, more particularly, to a method and apparatus for cutting grooves in an uncured concrete coating on an arcuate surface.

BACKGROUND OF INVENTION

The technique of cutting grooves in concrete to allow for expansion is well known. This has long been performed using high powered concrete saws. Only recently has this technique been applied to concrete coated pipe.

It is necessary to apply a high density concrete aggregate coating to pipe used in marine applications for antibuoyancy purposes. The concrete coating is normally several inches in thickness and is applied over an anti-corrosion protective coating. With the laying of pipe in deeper and deeper waters heretofore unknown problems have been encountered. Two problems in particular have evolved. One, the inability of the pipe to meet the greatly increased bending radius at the greater depths may result in buckling of the pipes requiring time consuming and costly procedures to remove the damaged joint. Second, even if the pipe does not buckle under the sharply increased bending radius, the concrete coating can "jump off" the pipe as the stress forces increase.

In order to overcome or at least reduce the possibility of the two foregoing problems it has become a requirement in certain instances to require heavy steel rod reinforcing in the concrete coating to strengthen it and reduce the possibility of the concrete jumping off the pipe. In addition, it is required that circumferential grooves be cut in the concrete coating at spaced intervals along the length of the pipe so as to permit a greater flexure of the pipe as it encounters the extreme bending radius necessary for a deep lay operation thus reducing the possibility of the pipe buckling under stress.

BRIEF SUMMARY OF PRIOR ART

The only known technique heretofore utilized to cut circumferential grooves in a concrete coated pipe is to employ a diamond-tooth saw after the concrete is cured. The saw blades are, of course, a very expensive item and this together with the labor required to cut the grooves adds considerably to the cost of coating the pipe. Very precise positioning of the equipment must be carried out in order to place the grooves between sections of reinforcing rods which are running longitudinally of the pipe. It is also necessary to precisely control the saw so as not to in any way damage the protective coating which underlies the concrete. This has necessitated that a small amount of the concrete be left next to the protective coating.

DETAILED DESCRIPTION OF THE INVENTION

It is therefore a primary object of the present invention to provide a method and apparatus for cutting grooves in concrete coated pipe which will remove all of the concrete at the groove down next to the protective coating.

As a corollary to the above object, an important aim of the invention is to provide a method and apparatus for cutting grooves in concrete coated pipe wherein there is absolutely no danger of damaging the protective coating underlying the concrete when the groove is cut.

Another important objective of the invention is to provide a method and apparatus for cutting grooves in concrete along an arcuate surface without utilizing a mechanical saw.

As a corollary to the preceding object, one of the objectives in this invention is to eliminate any possibility of damaging equipment on the reinforcing bars running longitudinally of a concrete coated pipe in the event there is a slight misalignment of the grooves.

It is also an important aim of the invention to provide a method and apparatus for cutting grooves in an arcuate surface which is faster and more economical than prior methods utilizing diamond tooth saws.

Our invention has a still another objective to provide a method and apparatus for cutting grooves in concrete coated objects having arcuate surfaces capable of adapting to grooves of different widths and different depths without major modification in equipment and procedure.

Another object of the invention is to provide a method of applying a concrete coating to pipe which eliminates wire mesh embedded in the concrete with resulting cost savings.

An important aim of the invention is also to provide a method as stated in the foregong object wherein the need for a chemical curing agent for the concrete is eliminated by wrapping the concrete in a plastic material which prevents evaporation of water.

Still a further objective is to provide a method of coating concrete pipe wherein grooves are to be cut in the concrete coating which facilitates cutting of the grooves by eliminating wire mesh in the concrete coating.

Other objects of the invention will be made clear or become apparent when the following description and claims are read in light of the accompanying drawings wherein:

FIG. 1 is a partial perspective view of a joint of pipe having reinforcing cages placed over a protective coating in preparation for application of a concrete coating;

FIG. 2 is a partially schematic end elevational view of the apparatus for application of an aggregate concrete coating to the joint of pipe;

FIG. 3 is a side elevational view of a joint of pipe coated with concrete and illustrating the manner in which grooves are cut through the concrete along the length of the pipe.

Figure 4:
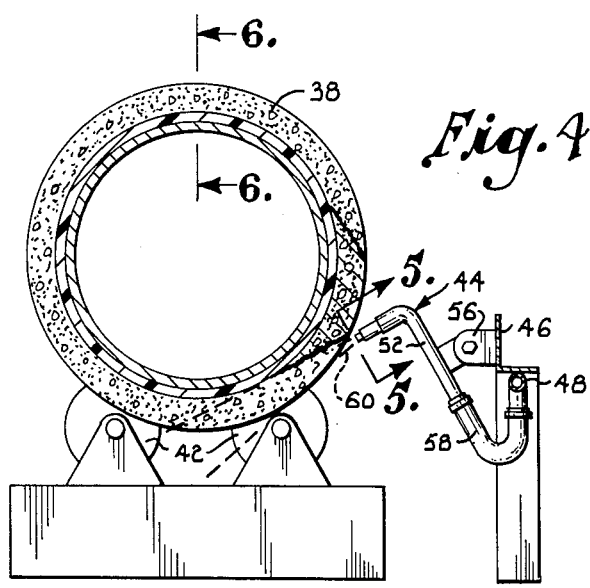
FIG. 4 is a vertical cross-sectional view taken along line 4—4 of FIG. 3 and illustrating details of the apparatus for cutting a groove in the concrete coating.

Referring initially to FIG. 1, a joint of pipe is designated generally by the numeral 10 and is normally approximately 13 meters in length with a wall thickness of 2–3 centimeters. The outer surface 12 of the pipe 10 is normally coated with a layer 14 of a protective coating which may be comprised of an asphaltic mastic material, butyl rubber, polyethylene or other suitable material.

Placed along the length of pipe 10 in spaced relationship to the protective coating layer 14 are a plurality of reinforcing cages designated generally by the numeral 16. Each cage 16 is comprised of circumferentially extending loops 18 which are rigid with longitudinally extending rods 20. Each of the cages is held in spaced relationship to coating 14 by a plurality of fingered spacers 22 which are snap fitted onto alternate loops 18 circumferentially around the pipe. It is contemplated that other means of holding cages 16 in spaced relationship to surface 14 may also be utilized. It is also the practice to space cages 16 apart a small distance as they are placed longitudinally along the pipe so as to leave a gap in the area designated by the numeral 24 where grooves are ultimately to be cut. It should be emphasized, however, that with the method and apparatus of the present invention it is not necessary to space cages 16 so as to allow for gap 24 even though this has been a requirement with prior art devices.

A cement and iron ore aggregate mixture 26 is delivered by a first conveyor 28 to an applicator comprising a second conveyer 30 and a rotating wire brush 32. The aggregate material 26 is flung onto pipe 10 by the brush 32 rotating at a high speed adjacent conveyor 30. Pipe 10 is rotated about its axis by powered rollers 34 and is also moved longitudinally as the aggregate-cement mixture is applied to it. A wire mesh material 36 of the type commonly refered to as "chicken wire" is fed into the aggregate-cement mixture to hold it in place as pipe 10 is rotated. Water is sprayed onto the aggregate-cement mixture as it is applied to the pipe. The end result is a uniform concrete coating 38 of several centimeters in thickness on the outside of protective coating 14.

Preferably immediately after concrete coating 38 is applied and at any rate prior to curing of the concrete, pipe 10 is moved to a groove cutting station designated generally by the numeral 40 in FIG. 3. Station 40 comprises spaced apart sets of rollers 42 at least one of which is powered by a prime mover (not shown). A plurality of nozzle units designated generally by the numeral 44 are disposed in spaced relationship along a rigid mounting plate 36. Nozzles 44 are intercommunicated by a common manifold 48 one end 50 of which is coupled with a source of pressurized water.

Figure 6:
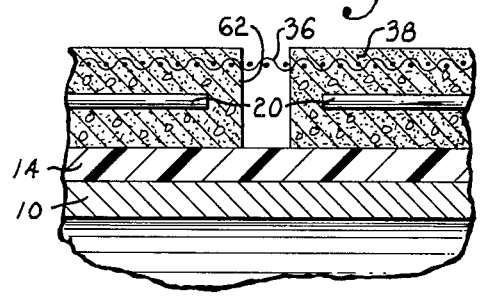
FIG. 6 is a vertical cross-sectional view on an enlarged scale and taken along line 6—6 of FIG. 4.
Figure 5:
FIG. 5 is a fragmentary elevational view on an enlarged scale of the delivery nozzle orifice.

As best illustrated in FIGS. 4 and 6, each nozzle 44 comprises a generally L-shaped head 52 having an orifice opening 54 and a pivotal coupling 56 with plate 46. A flexible hose 58 couples head 52 with manifold 48. It has been found desirable for orifice 54 to have a diameter of from 1–3 millimeters and for the pressure of the water at head 52 to be within the range of 20 to 60 kilograms per square centimeter. A preferred embodiment of the invention utilizes a nozzle opening of 1 millimeter and a pressure of 40 kilograms per square centimeter.

Pipe joint 10 is rotated on rollers 42 at a speed of 5 to 10 r.p.m. Nozzle heads 52 are adjusted relative to the pipe joint so that the jet stream 60 emanating from orifice 54 will be directed along a line generally tangential of the surface of layer 14. It is also desirable to have nozzles 44 disposed in a generally downwardly direction so as to carry the concrete material away from the pipe. As the pipe rotates and nozzles 44 are operated in the manner described, grooves 62 are cut in the concrete coating 38. With the size of opening 54 being within the range stated, the opening should be spaced from the concrete coating 38 a distance of from 5–15 centimeters and preferably about 10 centimeters. As the width of spray jet 60 increases with the distance from orifice opening 54, the precise position of the nozzle 44 relative to the coating will be partially dependent upon the desired width for groove 62.

It has been found that when wire reinforcing 46 is embedded in concrete layer 38 according to prior art procedures there is a tendency for water jet 60 to undercut the sides of groove 62 to some degree as the water strikes the wire reinforcing. While a limited degree of undercutting can be tolerated and does not detract from the effectiveness of the present invention, it has been found that the wire reinforcing may be moved to a location near the surface of the concrete where the jet spray 60 has dissipated to a lesser degree and thus is more able to penetrate the wire reinforcing without "scattering" and thus undercutting the sides of the grooves.

Figure 7:
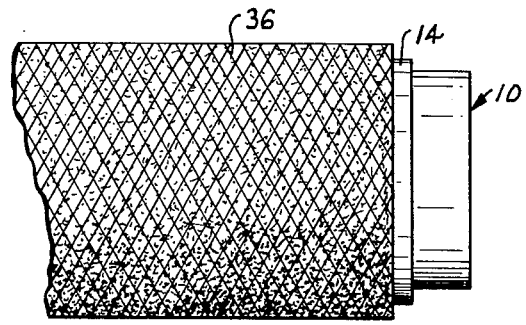
FIG. 7 is a fragmentary side elevational view illustrating utilization of wire mesh around the outer periphery of the concrete coating material rather than embedded in the coating.

As illustrated in FIG. 7, it has also been found that wire reinforcing 36 may be wrapped around the outside of concrete layer 38 to hold the concrete in place during the application of the cement and aggregate mixture and until partial curing is completed. The wire may then be removed completely from the concrete layer and may even be reused resulting in considerable cost saving.

Figure 8:
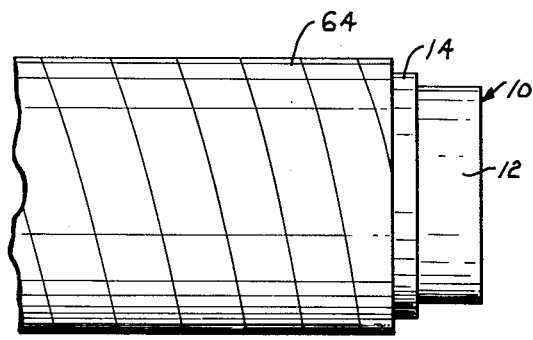
FIG. 8 is a fragmentary side elevational view illustrating the manner in which a concrete coated pipe may be wrapped with a plastic material around its outer periphery as a substitute for the embedded wire mesh normally placed in the coating.

Another embodiment of the invention is illustrated in FIG. 8 wherein an impervious plastic sheet material 64 is wrapped around concrete layer 38 to hold it in place. The utilization of the plastic wrap 64 allows for complete elimination of chicken wire 36 either embedded in or on the outside of the concrete. Also, since the impervious plastic material 64 prevents evaporation of water it is not necessary to add a chemical curing agent to the coating layer 38. Thus, it is seen that the present invention also emcompasses a method of applying a concrete coating to a pipe which comprises winding a layer of wrapping material around the outside of the concrete coating as the pipe is rotated and moved longitudinally, simultaneously with application of the cement to the pipe. The wrapping material is then unwound to expose the concrete coating after the latter has at least partially cured. The wrapping material may be wire mesh such as chicken wire or an impervious plastic material such as polyethylene.

Having thus described our invention, we claim:

1. A method of cutting a circumferential groove through an uncured concrete coating on a generally cylindrical pipe, having a curved outer surface on which said coating is applied, said method comprising:

supporting said pipe with the axis of curvature of said curved outer surface extending substantially horizontally;

projecting a jet stream of water in a downward direction transverse to said axis and tangent to said curved surface of said pipe at a point at least 45 circumferential degrees below the plane of said axis; and effecting relative rotation between said coated pipe and said jet stream, about said axis at a rate of from 5 to 10 r.p.m.

2. A method of cutting a circumferential groove through an uncured concrete coating on a generally cylindrical pipe, having a curved outer surface on which said coating is applied, said method comprising:

supporting said pipe with the axis of curvature of said curved outer surface extending substantially horizontally;

projecting a jet stream of water, at a pressure from 20 to 60 kg/cm², in a downward direction transverse to said axis and tangent to said curved surface of said pipe at a point at least 45 circumferential degrees below the plane of said axis; and effecting relative rotation between said coated pipe and said jet stream, about said axis.

* * * * *